United States Patent
Hoose

(10) Patent No.: US 8,279,525 B2
(45) Date of Patent: Oct. 2, 2012

(54) THREE-DIMENSIONAL DIFFRACTIVE STRUCTURE, METHOD FOR MAKING, AND APPLICATIONS THEREOF

(75) Inventor: John Hoose, Fairport, NY (US)

(73) Assignee: Lumella, Inc., Fairport, NY (US)

( * ) Notice: Subject to any disclaimer, the term of this patent is extended or adjusted under 35 U.S.C. 154(b) by 577 days.

(21) Appl. No.: 12/469,904

(22) Filed: May 21, 2009

(65) Prior Publication Data

US 2009/0290217 A1    Nov. 26, 2009

Related U.S. Application Data

(60) Provisional application No. 61/054,880, filed on May 21, 2008.

(51) Int. Cl.
*G02B 5/18* (2006.01)
(52) U.S. Cl. ....................................... 359/569
(58) Field of Classification Search .................. 359/569, 359/571, 574, 575, 576; 398/84, 87
See application file for complete search history.

(56) References Cited

U.S. PATENT DOCUMENTS

| | | | |
|---|---|---|---|
| 6,487,019 B2 | 11/2002 | Hoose | |
| 6,496,622 B1 | 12/2002 | Hoose et al. | |
| 2003/0016448 A1* | 1/2003 | Takasuka et al. | 359/569 |
| 2003/0174402 A1 | 9/2003 | Kittaka et al. | |
| 2005/0213214 A1 | 9/2005 | Bidnyk et al. | |
| 2006/0192973 A1 | 8/2006 | Aiyer et al. | |

FOREIGN PATENT DOCUMENTS

JP    2001013006 A    1/2001

* cited by examiner

*Primary Examiner* — Alessandro Amari
(74) *Attorney, Agent, or Firm* — William Greener; Bond, Schoeneck & King, PLLC

(57) ABSTRACT

Three-dimensional grating device includes two (crossed) diffraction gratings, exhibits diffraction efficiency substantially independent of the incident polarization inside an optical communication spectral window from 1.5-1.6 μm. The gratings are characterized by different periods in two directions, chosen to support only one dispersive diffraction order in addition to the zero-(specular) order. Gratings may be orthogonal. Exemplary grating profiles include but are not limited to sinusoidal and truncated pyramidal (trapezoidal) profiles. A method for diffracting polarization independent light with 90% or higher efficiency. Applications include various wavelength control devices particularly useful in telecommunications.

31 Claims, 15 Drawing Sheets

Figure 8    confidential x-slice:

Figure 9  Confidential and z-slice:

Figure 11 Confidential

Confidential

THREE-DIMENSIONAL DIFFRACTIVE STRUCTURE, METHOD FOR MAKING, AND APPLICATIONS THEREOF

RELATED APPLICATION DATA

This application claims priority to U.S. provisional application Ser. No. 61/054,880 filed on May 21, 2008, the subject matter of which is incorporated herein by reference in its entirety.

GOVERNMENT SPONSORSHIP

N/A.

FIELD OF THE INVENTION

Embodiments of the invention generally relate to the fields of optical telecommunications and optical diffraction. More particularly, embodiments of the invention relate to a novel diffraction gratings particularly suited for use in telecommunication and laser devices, to wavelength selection by said devices, and to new types of wavelength multiplexer/de-multiplexer devices that they enable.

BACKGROUND

Diffraction gratings are used to separate the various channels in wavelength division multiplexing (and de-multiplexing) applications according to wavelength. Various free space diffraction grating designs are known in the art. Presently, the performance of these diffraction gratings is limited by (high) polarization dependent loss (PDL) and (low) diffraction efficiency, due in part to manufacturing tolerances. The reduction of the polarization dependence can be achieved by using deeper gratings, either in reflection or transmission, but is limited when higher-incident angles are required to increase the dispersion.

The next generation of high performance telecommunication systems will require diffraction efficiency greater than 90%, polarization dependent loss less than 0.25 dB, uniformity of diffraction efficiency better than 5% over the wavelength range of 1300 to 1600 nm, ease of manufacture, and out of plane geometry, at lower cost than what is currently available.

As used herein, WDM (wavelength division multiplexing) will be used to describe any of the various wavelength selective devices/systems used for the separation or combination of optical communication channels of different wavelengths, including DWDM (dense wavelength division multiplexing), WSS (wavelength selective switch), CWDM (coarse wavelength division multiplexing), etc.

The general purpose of a diffraction grating is to disperse (or bring together) light as a function of wavelength and angle. The basic equation that describes this behavior is:

$$m\lambda/d = \sin(\alpha) + \sin(\beta), \quad (1)$$

where m is the diffraction order, $\lambda$ is the wavelength of interest, d is the periodic groove spacing of the grating, $\alpha$ is the angle of incidence of the light onto the grating relative to the grating surface normal, and $\beta$ is the angle of diffraction of the light leaving the surface of the grating relative to the grating surface normal.

The amount of dispersion, which here is defined as the change in diffraction angle per change in wavelength, is described by the equation:

$$d\beta/d\lambda = m/(d\cos(\beta)), \quad (2)$$

where the definition of terms is the same as for equation 1.

The light that is input to a grating may be of a single polarization or a combination of two polarizations (e.g., orthogonal polarizations). The orthogonal polarizations are called TE (transverse electric) and TM (transverse magnetic). In a typical optical telecommunication wavelength channel separation or combination system, the light that is separated or combined is referred to as de-multiplexed or multiplexed, respectively. For purposes of this invention description, de-multiplexing systems will be described, although the embodiments of the invention are intended to also cover multiplexing systems, as one skilled in the art will appreciate.

Light exiting a fiber optic cable is a combination of TE (P-polarized) and TM (S-polarized) light. The particular polarization state (TE or TM) may vary randomly in time. Thus in order to obtain all of the information being carried by the light intensity via the fiber optic cable, both polarizations, which together carry the data being transmitted, must be utilized. Traditional diffraction gratings generally possess different diffraction efficiencies for the different polarization states of the incident light, which can lead to a loss of information. The measure of this loss is called the polarization dependent loss (PDL) and is defined to be proportional to the ratio of the diffraction efficiencies for the separate polarizations expressed in decibels (dB). A low PDL is required for WDM-type systems to maintain a low error rate and high information fidelity.

FIG. 1 illustratively shows a triangular groove, ruled diffraction grating as known in the art, where reference numeral 1 is the substrate, usually glass, that supplies a rigid surface upon which the ruled grating structures are located. Reference numeral 2 is the periodic groove structure, shown in cross section and illustrating only a few of the grooves, which in this illustrative example are metal coated. The incident light to be diffracted is shown by reference numeral 3. Reference numerals 4 and 5 represents the diffracted light, which is separated in angle by wavelength, where reference numeral 4 represents a wavelength $\lambda_1$ that is different than $\lambda_2$ shown by reference numeral 5.

Angular dispersion, as described by equation 2, can be measured for a typical grating, as might be employed, e.g., in a WDM-type application, to be $d\beta/d\lambda = m/(d\cos(\beta)) = 1/(1.01*0.73) = 1.24$ rad/μm. This value was calculated for a 900 groove/mm grating, or equivalent, at 1.5 micron wavelength in Littrow mount (i.e., angle of incidence equals angle of diffraction). For this particular example, $\beta$ was approximately 43 degrees. FIG. 2 shows the diffraction efficiency of TE polarized light 2 and TM polarized light 1 for the ruled grating of FIG. 1. Reference numeral 3 represents the polarization dependent loss (PDL) as calculated from the ratio of the TE- and TM-polarized diffracted light. The PDL for such a grating, coupled with the low diffraction efficiency and low angular dispersion, combine to limit their usefulness for telecom applications. State of the art systems require higher angular dispersion, with nearly zero PDL, coupled with higher diffraction efficiency.

When higher angular dispersion is required, for example, to reduce the size of the WDM-type device, systems may typically utilize a sinusoidal diffractive groove shape. FIG. 3 represents a prior art sinusoidal surface relief diffraction grating as seen in cross section, similar to FIG. 1, except that the groove structure is sinusoidal instead of triangular. In this case, as in that of the ruled grating, the grooves are invariant in one direction and periodic in the orthogonal direction. The substrate is again represented by reference numeral 1, while the sinusoidal groove structure is represented by reference numeral 2. The incident light 3, is diffracted and separated into light of different wavelengths, 4 and 5, according to the grating equation. The angles used to calculate the diffraction directions are measured, as in all cases, relative to the grating normal 6.

FIG. 4 illustrates a typical plot 41 of diffraction behavior, representing diffraction efficiencies for TE-(43) and for TM-(42) polarizations for a sinusoidal grating as shown in FIG. 3. In this exemplary illustration, the period is d=0.909 microns and the PDL is greater than 0.7, which is greater than the requirement for gratings used in WDM-type devices. The PDL of such a grating is greater than 1.0 dB for TM efficiencies above 90%. TE efficiency is less than 40%; consequently, additional optics are required to convert TE polarized light from the fiber optic transmission system into TM polarization, where after the diffraction grating can disperse it into the various channels required. The optical components that convert one polarization into the opposite polarization add additional losses and costs to the system.

When higher angular dispersion is required, larger angles of diffraction are required according to equation 2. The difference between the efficiencies in TE and TM polarization then becomes much more significant. An example for a ID sinusoidal gold grating with period d=1.2056 µm that works around Littrow mount at wavelength 1.55 µm is shown with regard to FIGS. 5(*a-c*). FIG. 5*a* shows the efficiency in order 1 at light incidence equal to 40°. The groove depth dependence in FIG. 5*a* shows the possibility to obtain equal TE and TM efficiency with relatively deep grooves (groove depth-to-period ration h/d=1.128). FIG. 5*b* shows the spectral dependence for h/d=1.128 and parameters from (a). Although the spectral dependence behaves in an opposite manner in both polarizations, overall acceptable results might be achieved within the working spectral interval. FIG. 5*c* shows the groove depth dependence for an incidence of 60° and period d=0.89489 µm. As observed, when higher angular dispersion is required (shorter period and larger incident angle), it is not possible to achieve sufficiently high enough in the TE polarization.

Currently deployed prior art WDM-type systems are single use, meaning that the optical system utilizes one input and one output for each diffraction grating. Such a WDM-type system, in this case a de-multiplexer 600-1, is illustrated in FIG. 6. The input fiber optic cable 61 emits light 62 that is collimated by the lens 63. The light, which contains elements of both TE and TM polarization, passes through a device 64, which converts TE polarization into TM while not changing the incident TM polarization. This allows the diffraction grating 65 to see only a single polarized light where the diffraction efficiency is relative high, such as the grating of FIG. 3, whose efficiency is shown in FIG. 4 as reference numeral 42. The diffracted light 66 is separated by wavelength into different angles, passes through a lens 67, and is brought to focus at 68 for analysis, switching, or further transmission, to name a few of the many results of separating the optical communication channels. To those skilled in the art, such a system can be used in the reverse direction and operated as a multiplexer to combine many wavelengths onto the same fiber. This would require the input to be reference numeral 68, the polarization rotator device 64 to be placed adjacent to 67, and the output would be into 61.

In order to shrink the size, reduce the cost, and achieve desired performance, telecommunication systems will require higher groove frequencies with substantially equal diffraction efficiency for both TE and TM polarizations.

SUMMARY

An embodiment of the invention is directed to a three-dimensional diffractive device. The device includes a substrate having a diffracting structure, wherein the structure further includes a first periodic diffracting structure having a periodicity, $d_x$, in a first direction, and a groove depth, $h_x$, characterized by only a single dispersing diffracting plane that supports a single propagating first-dispersing-order of light and a zero-specular order; and a second periodic structure having a periodicity, $d_z$, in a second direction that is different than the first direction, and a groove depth, $h_z$, that supports only a zero-specular order for the periodicity $d_z$. The periodic structures are three-dimensional and may employ a combination of metals and/or dielectric layers to achieve diffraction efficiency greater than 90% and in certain aspects, 95% or more. The diffractive device may also provide an angular dispersion greater than 1 degree/nm. According to an aspect, diffraction efficiency can be substantially equal for both TE and TM polarizations of incident light. According to an aspect, the periodic structures are orthogonal. In various aspects, the periodic structures include, but are not limited to, sinusoidal, trapezoidal, rectangular, square, pyramidal, and cylindrical forms and combinations thereof. The different periodicities allow diffraction effects with substantially equal TE and TM efficiency performance to take place in the plane defined by the orthogonal to a particular set of periodic structures as well as out of the plane (called 'conical diffraction') by three degrees or more. According to an aspect, a dielectric layer applied to the surface of a metallic-coated, three-dimensional sinusoidal grating can enhance the TE polarization diffraction efficiency to allow for shallower grooves and equal TE and TM polarization for low PDL. This may further make manufacturing easier. According to an aspect, the diffractive structures can be constructed to provide simultaneous dispersion in both in plane and out of plane (conical diffraction) operation, thus allowing for more than one optical system or WDM-type system to be employed utilizing a single grating. In-plane directions are defined to be perpendicular to a particular set of periodic grating structures. Out-of-plane, or conical, diffraction is defined to be at an angle with respect to the plane perpendicular to the periodic grating structure. According to an aspect, the diffractive device may incorporate a curved substrate.

Another embodiment of the invention is directed to an optical wavelength control apparatus that operates on one or more wavelengths of light from a source within a specified optical communications wavelength range. The optical wavelength control apparatus includes a light input port for the one or more wavelengths of light within a specified wavelength range, a light output port for the one or more wavelengths of light within a specified wavelength range, and a three-dimensional diffractive device disposed intermediate the input and output ports. The diffractive device comprises a substrate having a diffracting structure that further includes a first periodic diffracting structure having a periodicity in a first direction, and a groove depth, characterized by only a single dispersing diffracting plane that supports a single propagating first-dispersing-order of light and a zero-specular order, and a second periodic structure having a periodicity in a second direction that is different than the first direction, and a groove depth, that supports only a zero-specular order for the second periodic structure. According to an aspect, the three-dimensional diffractive device has an in-plane optical path for dispersing light from a first source and an out-of-plane optical path for dispersing light from a second source. Exemplary optical wavelength control apparatus include, but are not limited to, a wavelength division multiplexer and a wavelength selective switch.

A related embodiment of the invention is directed to a method for diffracting light within a specified optical communications wavelength range with a substantially polarization-independent efficiency of 90% or more. In an aspect, the method involves illuminating a diffraction grating as outlined above and described in detail herein with light from a first source in a first plane that is orthogonal to the first periodic structure, and illuminating the grating with light from a second source in a second plane that is at an angle with respect to the first plane. According to the method, light is diffracted into only a zero-specular-order and a propagating, first-dispersing-order, generated by the first periodic structure.

The structures described herein can achieve approximately 95% or higher diffraction efficiency over the telecommunication band of interest, thus enabling a new class of higher performance WDM type assemblies, reduce telecommunication costs and allow performance not achievable by the currently available diffraction structures. For other wavelength bands, for instance near 1.4 microns, the design of the grating structures can be suitably altered. Alternating layers of high index and low index dielectric materials that can be used to achieve high diffraction efficiency as well as allow manufacture by standard lithographic methods as utilized in the semiconductor industry. Exemplary dielectric materials include but are not limited to $SiO_2$, $Al_2O_3$, $HfO_2$, silicon nitride, and silicon.

A laser holographic (interference) arrangement may provide a method for generating the periodic groove structures. For example, sinusoidal structures are exposed in photoresist to the period required for $d_x$, then the substrate is rotated 90 degrees and the same laser interference apparatus, suitably adjusted to produce the period $d_z$, is used to expose the same photoresist coated substrate, but with a different laser exposure level. Upon development, the crossed, unequal period structure will appear in surface relief. The structures can then be coated with a metal, for example by vacuum evaporation, or a similar process, followed by a dielectric layer.

Another method of production would allow the embodied invention, produced as a surface relief structure, to be used as a replication tool using standard epoxy casting or any number of similar processes to replicate the structure. To those skilled in the art, other production methods such as exposure of the 3-D groove pattern by means of lithographic exposure tools employing suitable masks, or nano-imprinting from a suitably designed template, for example, may be suitable for mass production.

Embodied structures may also be constructed on curved surfaces that could provide nearly equal TE and TM diffraction efficiency performance while simultaneously providing imaging properties to enable single optical device operation.

The subject matter of U.S. Pat. Nos. 6,487,019 and 6,496,622 is incorporated by reference herein in its entirety.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF EMBODIMENTS OF THE INVENTION

Reference will now be made in detail to the present exemplary embodiments of the invention, examples of which are illustrated in the accompanying drawings. Wherever possible, the same reference numbers will be used throughout the drawings to refer to the same or like parts.

Figure 1:
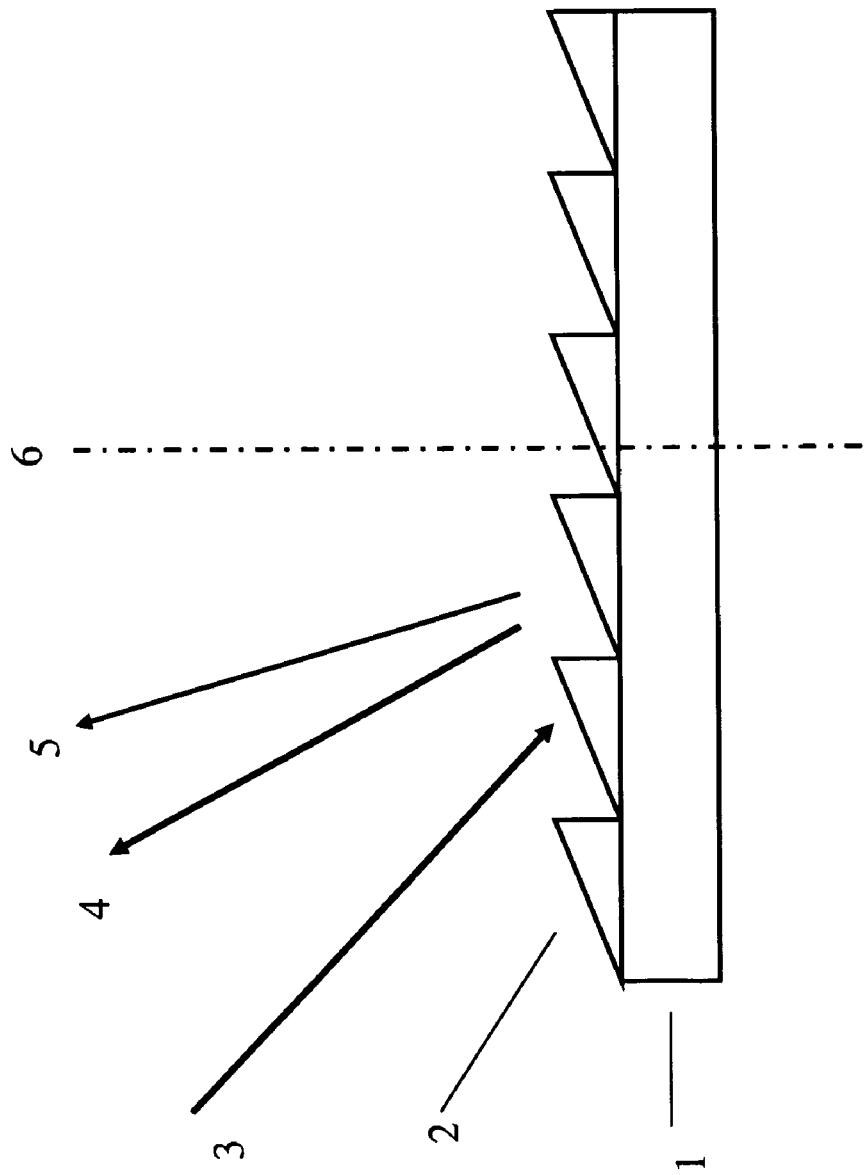
FIG. 1 shows a schematic cross sectional, triangular groove surface profile of a ruled diffraction grating as known in the art.
Figure 2:
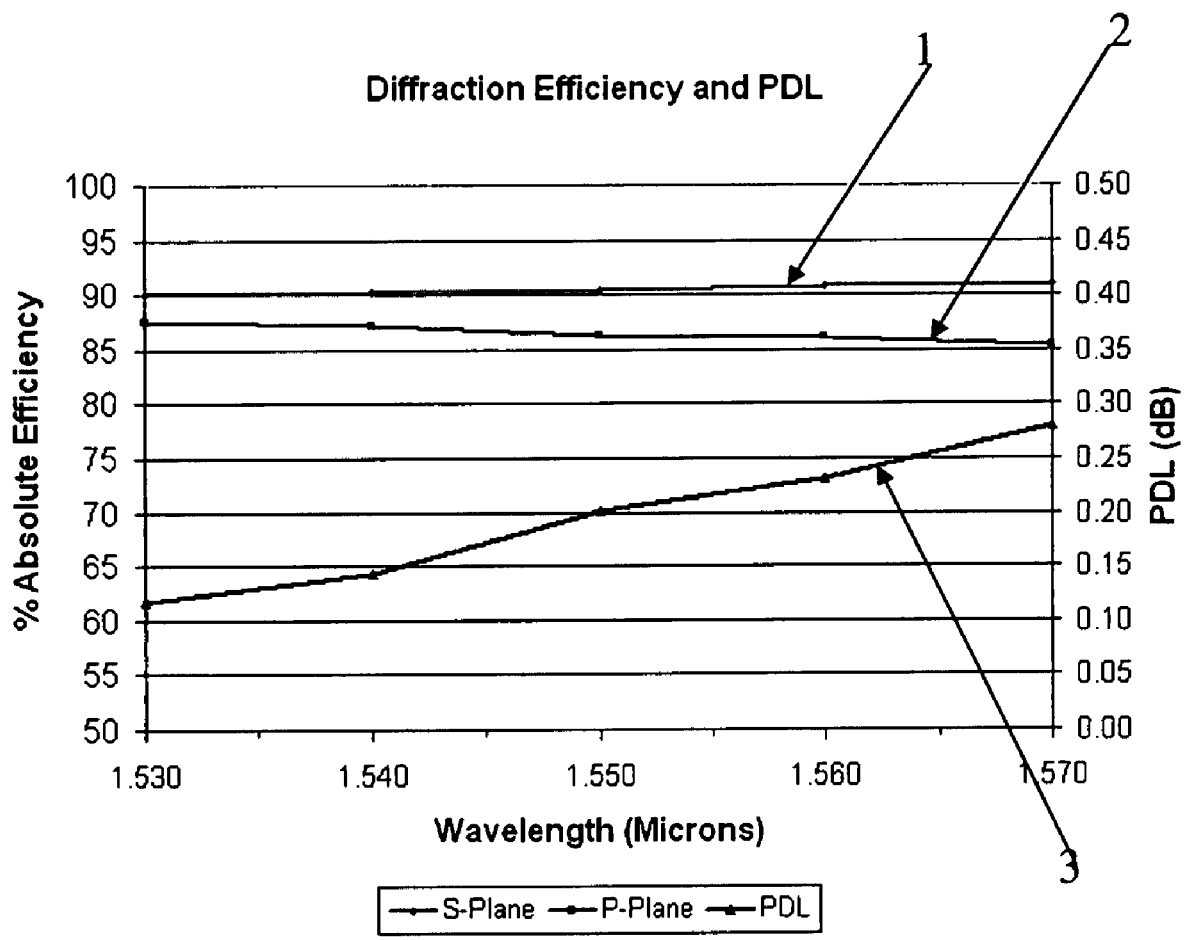
FIG. 2 is a graph showing the typical diffraction efficiency and polarization dependent loss (PDL) of a ruled diffraction grating as might be used for telecommunication activities as known in the art.
Figure 3:
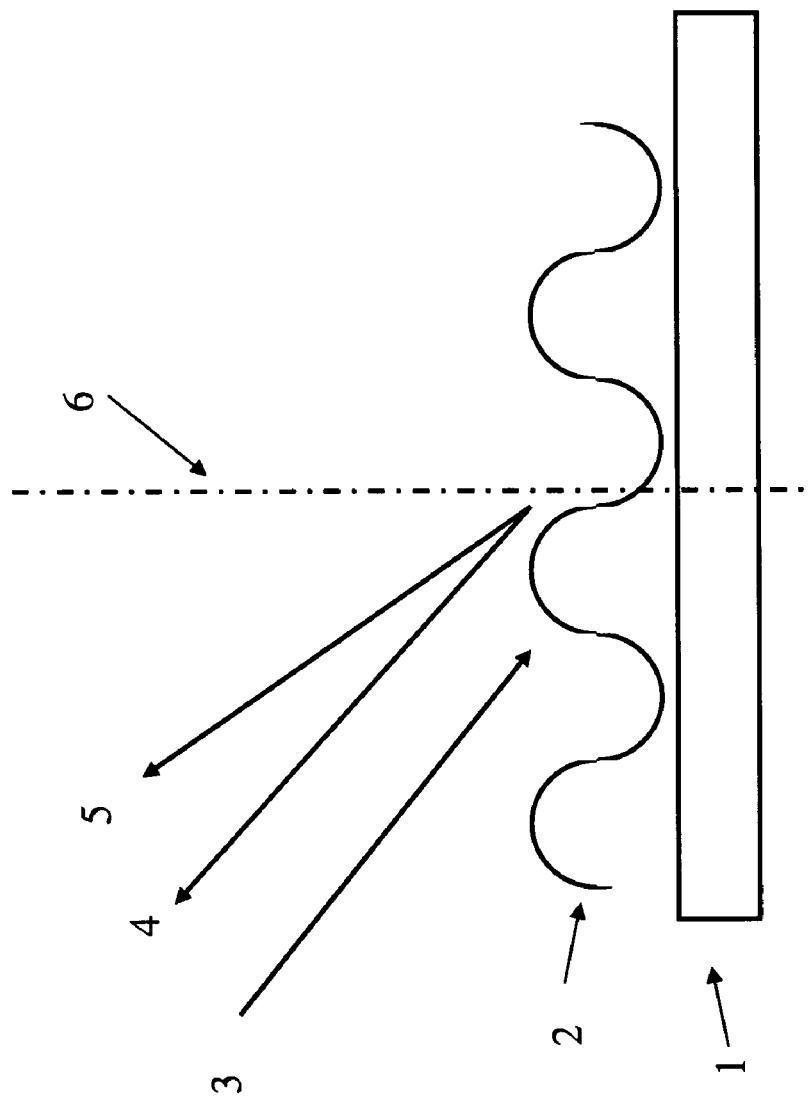
FIG. 3 shows a schematic cross sectional, sinusoidal groove surface profile of a ruled diffraction grating as known in the art.
Figure 4:
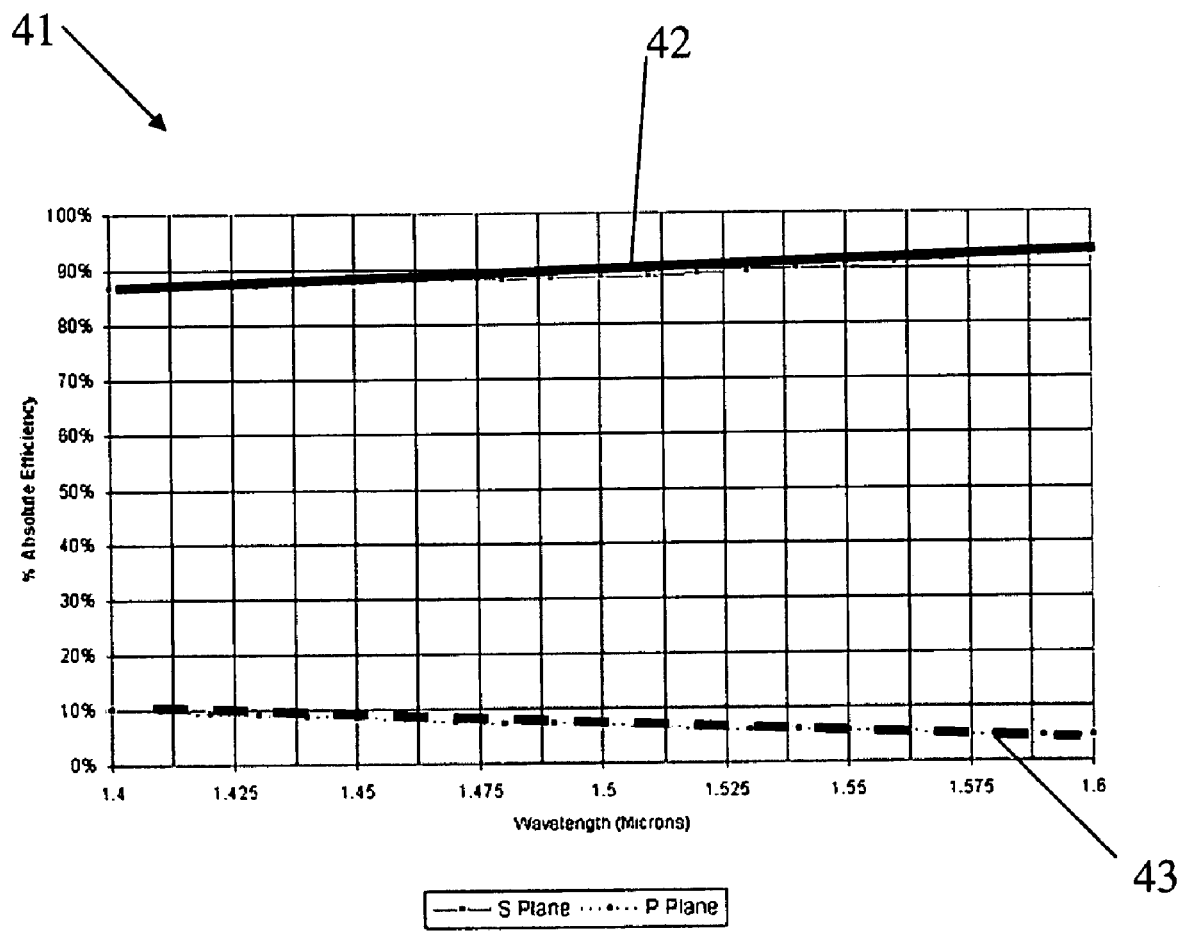
FIG. 4 is a graph showing the typical low diffraction efficiency and high PDL for one or the other of TE and TM polarized light over a common telecommunication wavelength band for a typical prior art sinusoidal grating as illustrated in FIG. 3.
Figure 5:
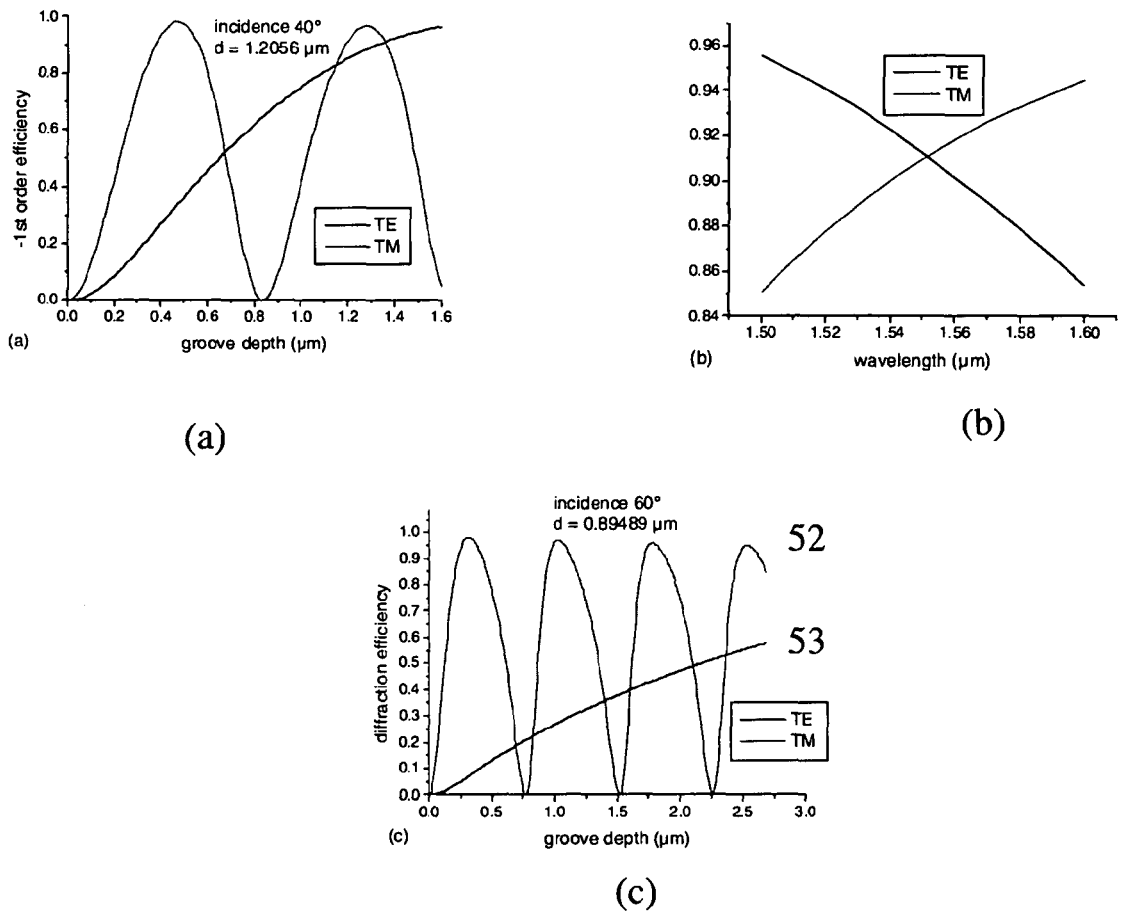
FIGS. 5(a-c) are graphs showing the efficiency in order 1 of a prior art ID sinusoidal gold grating with (a) incidence 40°, period d=1.2056 μm, groove depth dependence at 1.55 μm wavelength; (b) spectral dependence for h/d=1.128 and parameters from (a); and, (c) groove depth dependence for an incidence of 60° and period d=0.89489 μm.
Figure 6:
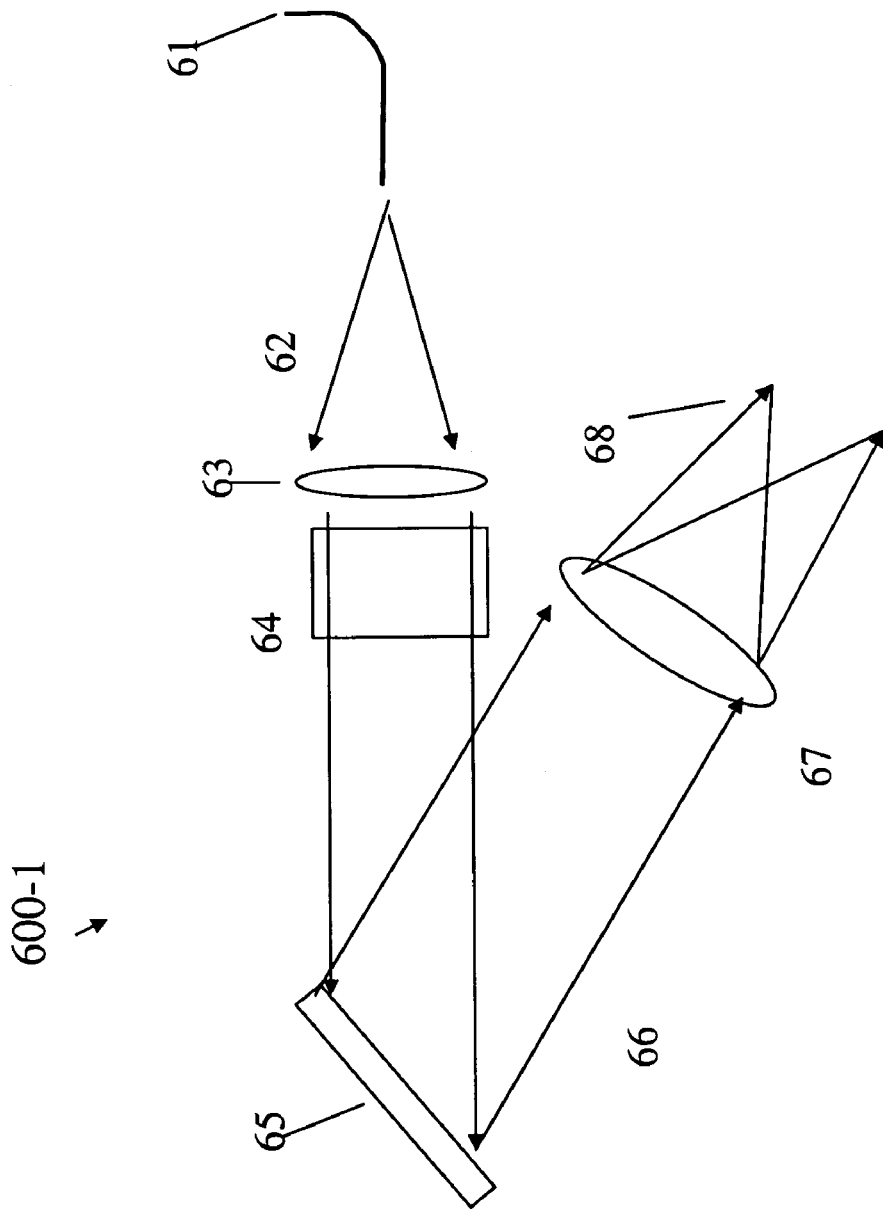
FIG. 6 shows a schematic diagram of a generic WDM-type system employing a sinusoidal grating such as that of FIG. 3 as known in the art.
Figure 7:
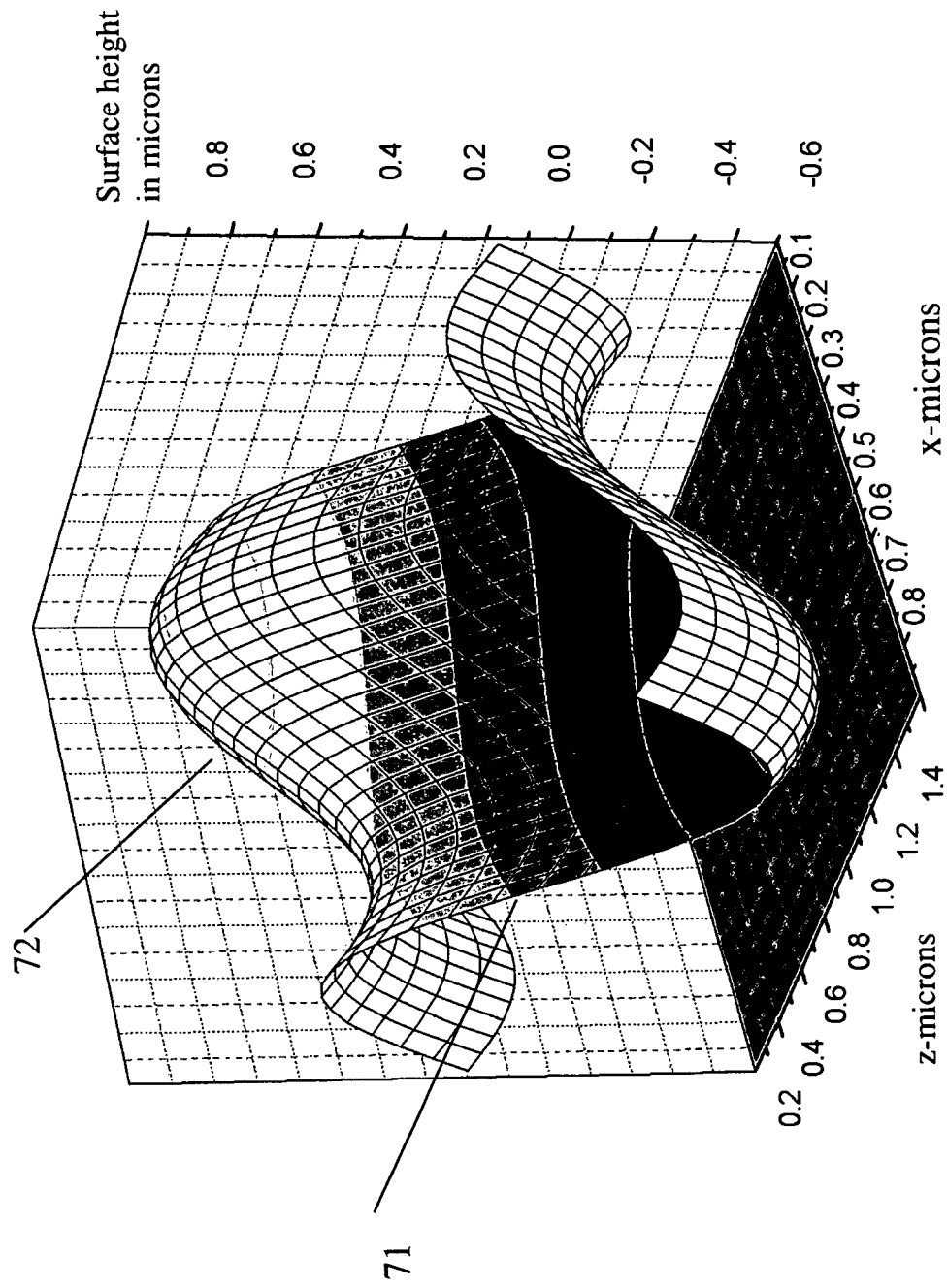
FIG. 7 graphically shows a three-dimensional sinusoidal groove structure for a diffraction grating according to an embodiment of the invention.
Figure 8:
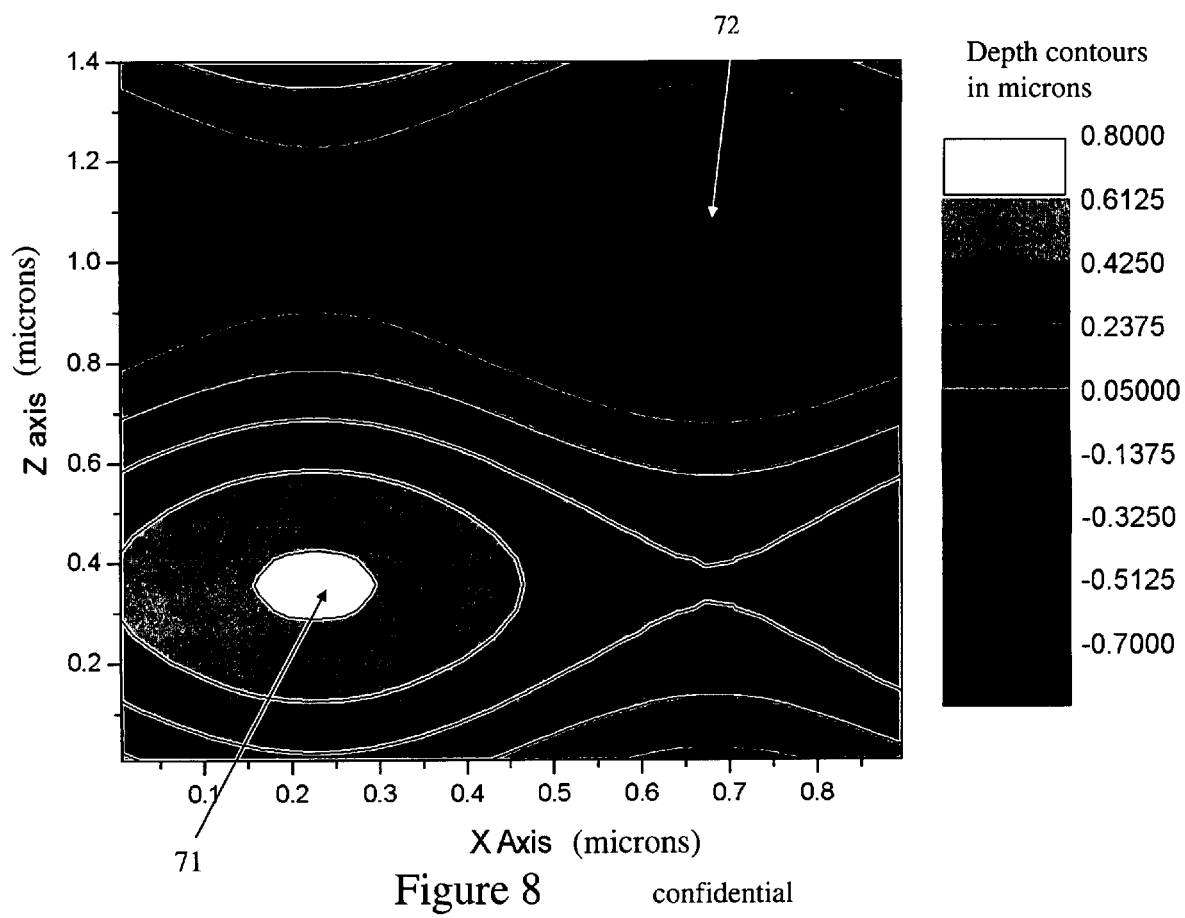
FIG. 8 shows a contour plot of a diffraction grating according to an embodiment of the invention.

An embodiment of the invention is a three-dimensional diffractive device, an example of which will be described in detail below with reference to FIGS. 7-10. FIG. 7 graphically illustrates a three-dimensional grating with a profile f(x, z), represented as a sum of two, intersecting sinusoids, where $$f(x,z)=(h_x/2)\sin(K_x x)+(h_z/2)\sin(K_z z), \quad (3)$$

with groove depth values $h_x$, $h_z$, and groove numbers, K, given by the corresponding periods, $K_x=2\pi/d_x$, $K_z=2\pi/d_z$. The grating lies in the x-z plane and the two axes (x, z) are orthogonal, although similar performance can be expected with axes inclined at some angle different from 90°. FIG. 7 illustrates one period of the many identical periodic structures. The structure in cross section in the x-direction 72 would then repeat in the x-direction, while the structure in cross section in the z-direction 71 would repeat in the z-direction. FIG. 8 illustrates an x-z representation of the structure shown in FIG. 7.

Figure 9:
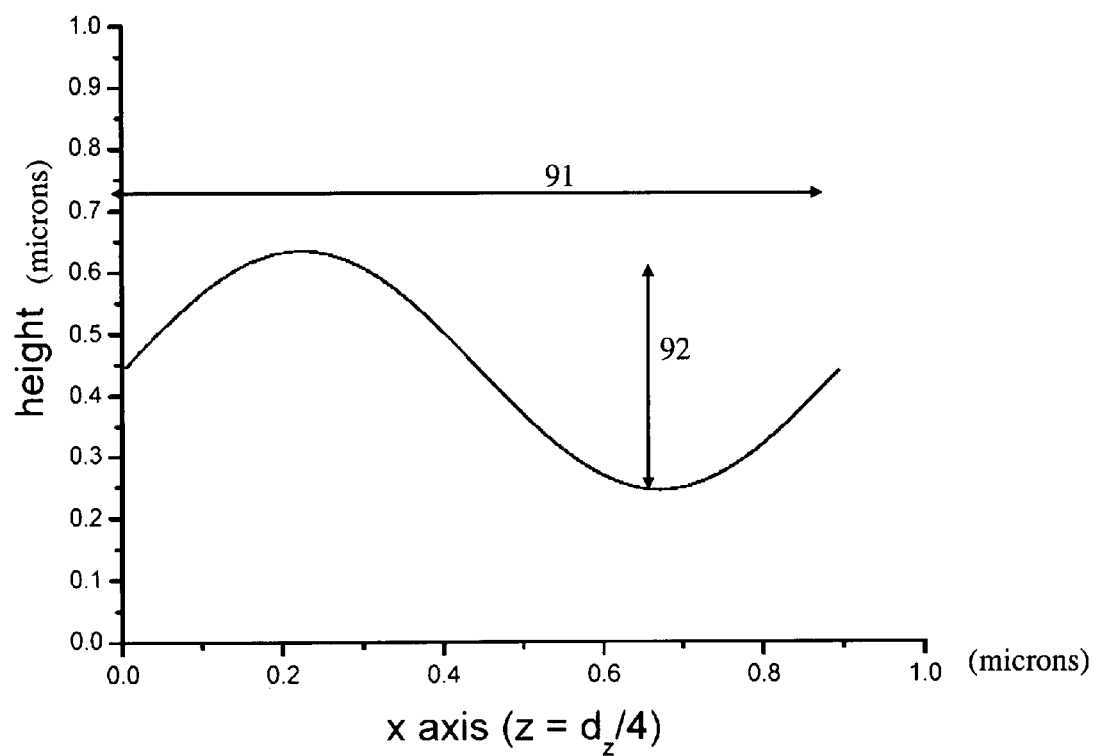
FIG. 9 shows a cross sectional profile along an x-direction of the diffraction grating illustrated in FIG. 7, according to an illustrative aspect of the invention.
Figure 10:
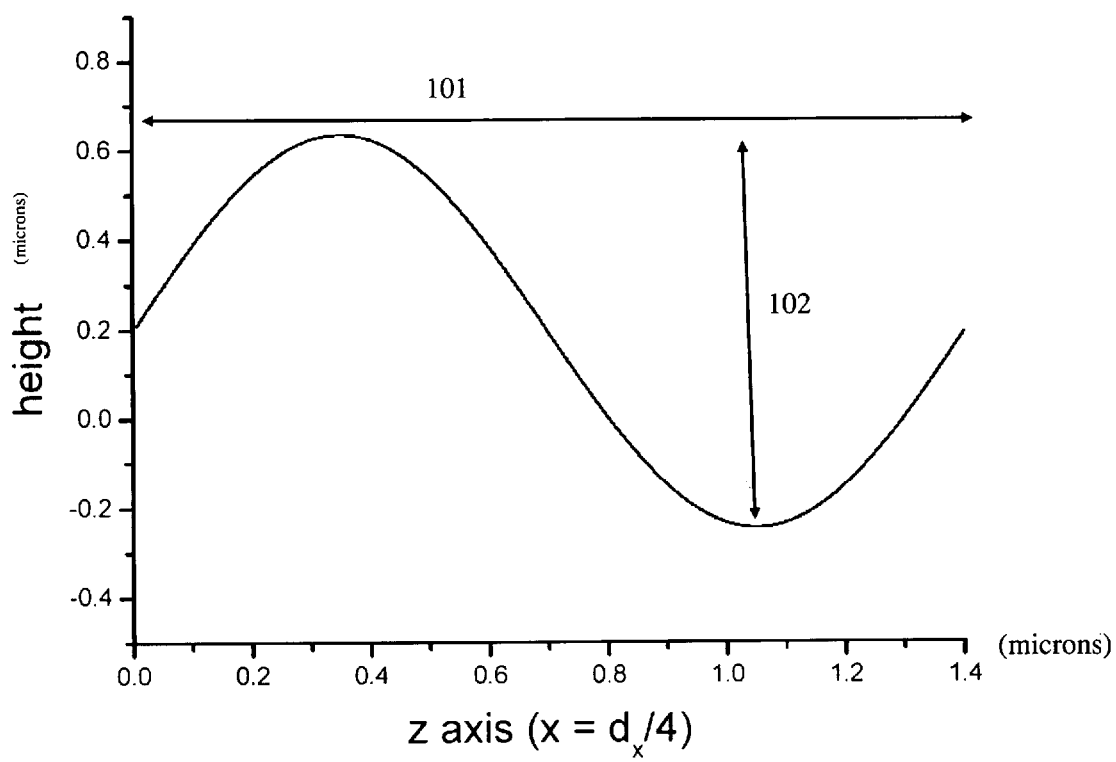
FIG. 10: shows a cross sectional profile along a z-direction of the diffraction grating illustrated in FIG. 7, according to an illustrative aspect of the invention.

FIGS. 9 and 10, respectively, illustrate in cross sectional profile, the periodicity $d_x$ (91) of the grooves along the x-axis having a depth $h_x$ (92) and the periodicity $d_z$ (101) of the grooves along the z-axis having a depth $h_z$ (102). Both $h_x$ and $h_z$ are constant along their respective periodic and orthogonal directions. As illustrated, $h_x$ and $h_z$ are different, but they may also be equal.

According to the instant embodiment, the surface relief patterns are coated with a metallic layer of a material such as gold, aluminum, or a similar high reflector useful for wavelengths near 1.5 microns, to a thickness of approximately 50 nanometers to 150 nanometers, to achieve the highest reflectance. In addition, a layer of a dielectric material such as $SiO_2$ or $Al_2O_3$ may be deposited onto the metallic layer to a thickness of approximately 50 nm to allow for shallower grooves and to achieve the desired diffraction efficiency for both TE and TM polarizations.

In the example diffraction grating shown in FIG. 7, the period $d_x$ is 0.895 microns, which is 1,117 grooves per mm. The sinusoidal grooves are coated with a layer of aluminum, and overcoated with 50±5 nm of $SiO_2$. In this case the angular dispersion as calculated by equation (2) is $d\beta/d\lambda=1/(0.895)(0.54)=2.07$ rad/μm. Thus the angular dispersion is greater than that for the prior art ruled grating described above.

Figure 11:
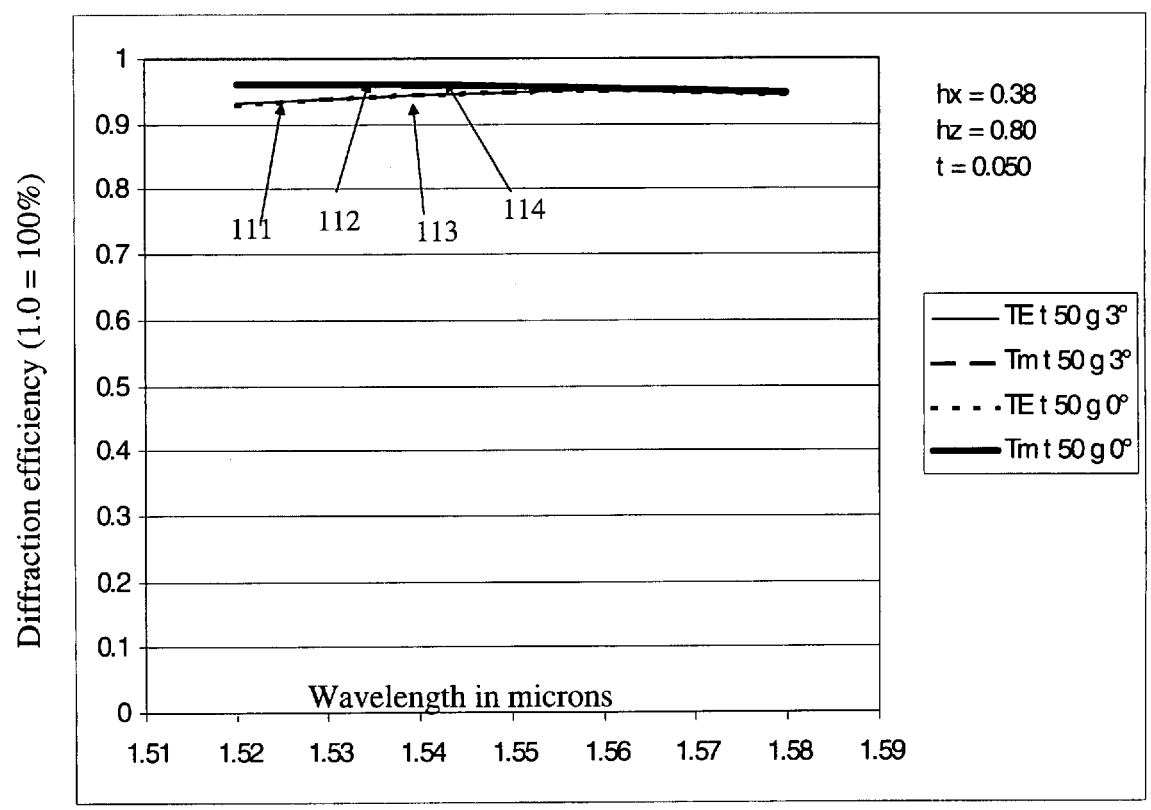
FIG. 11 graphically shows the in-plane and three degree out-of-plane diffraction efficiency for the grating as described in FIG. 7 coated with a dielectric coating, according to an illustrative aspect of the invention.

FIG. 11 illustrates the diffraction efficiency for the exemplary grating of FIG. 7, shown for a typical telecommunication wavelength band. The TE polarized diffraction efficiency of the in-plane diffraction is noted by reference numeral 111. The TM polarized diffraction efficiency of the in-plane diffraction is noted by reference numeral 112. The TE polarized diffraction efficiency for a light beam that is incident on the structure at three degrees out-of-plane is shown as reference numeral 113. The TM diffraction efficiency of a light beam that is incident on the structure at three degrees out-of-plane is shown as reference numeral 114. As can be seen, the TE diffraction efficiency for in-plane and out-of-plane diffraction is substantially the same. This result also holds for the TM polarized diffraction efficiency.

Figure 12:
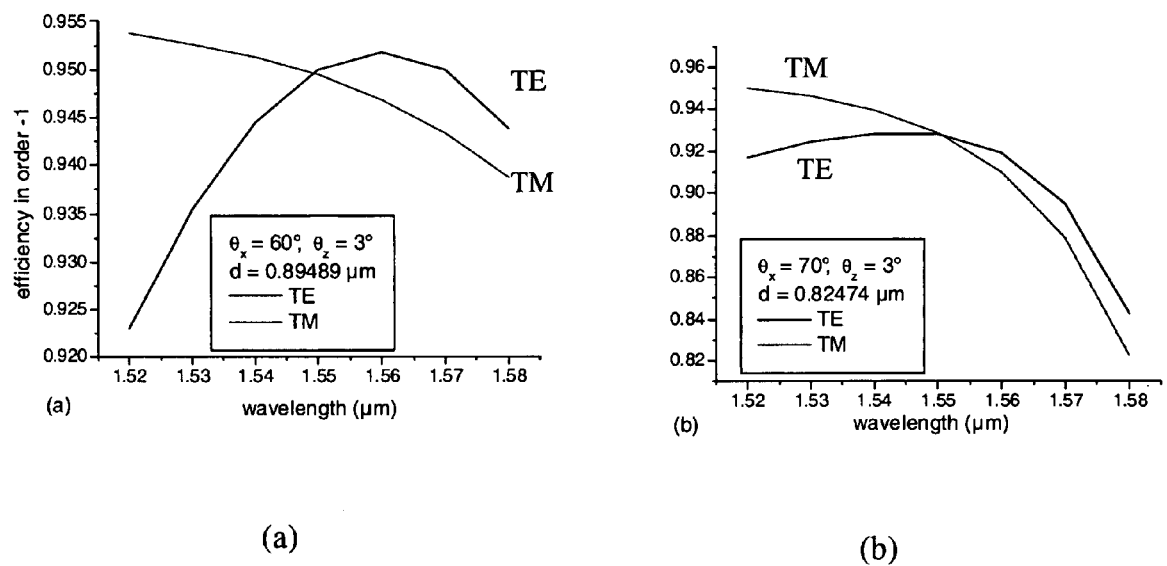
FIGS. 12(a,b) show the spectral dependence of two 3-D gratings, according to illustrative aspects of the invention

By varying the four possible geometrical parameters ($d_x$, $h_x$, $d_z$, $h_z$) of the grooves, it is possible to obtain high efficiency in unpolarized light at higher angles of incidence (i.e., higher angular dispersion), when compared to a single-period grating. FIGS. 12($a$,$b$) show the spectral dependence of two 3-D gratings with profiles given by Equ. (3) and as shown in FIG. 7. The grating comprised a gold substrate covered with a 50 nm thick layer of $SiO_2$; groove parameters were optimized for two different angles of incidence $\theta_x$ and 3° off-plane: (a) 60° incidence, $d_x=0.89489$ μm, $h_x=0.39$ μm, $d_z=1.4$ μm, $h_z=0.88$ μm; (b) 70° incidence, $d_x=0.82474$ μm, $h_x=0.3$ μm, $d_z=1.4$ μm, $h_z=0.72$ μm. In the first case, the polarization and spectral variations are shown to be smaller than 3%, with mean efficiency higher than 93%. The 50 nm layer of $SiO_2$ increased the efficiency by about 4% when compared to a bare gold surface.

For wavelength demultiplexing applications, the 3-D grating is designed to work as a 2-D grating (having periodicity in a single direction), i.e., it supports only a single dispersive order (in addition to zero-order specular light).

Figure 13:
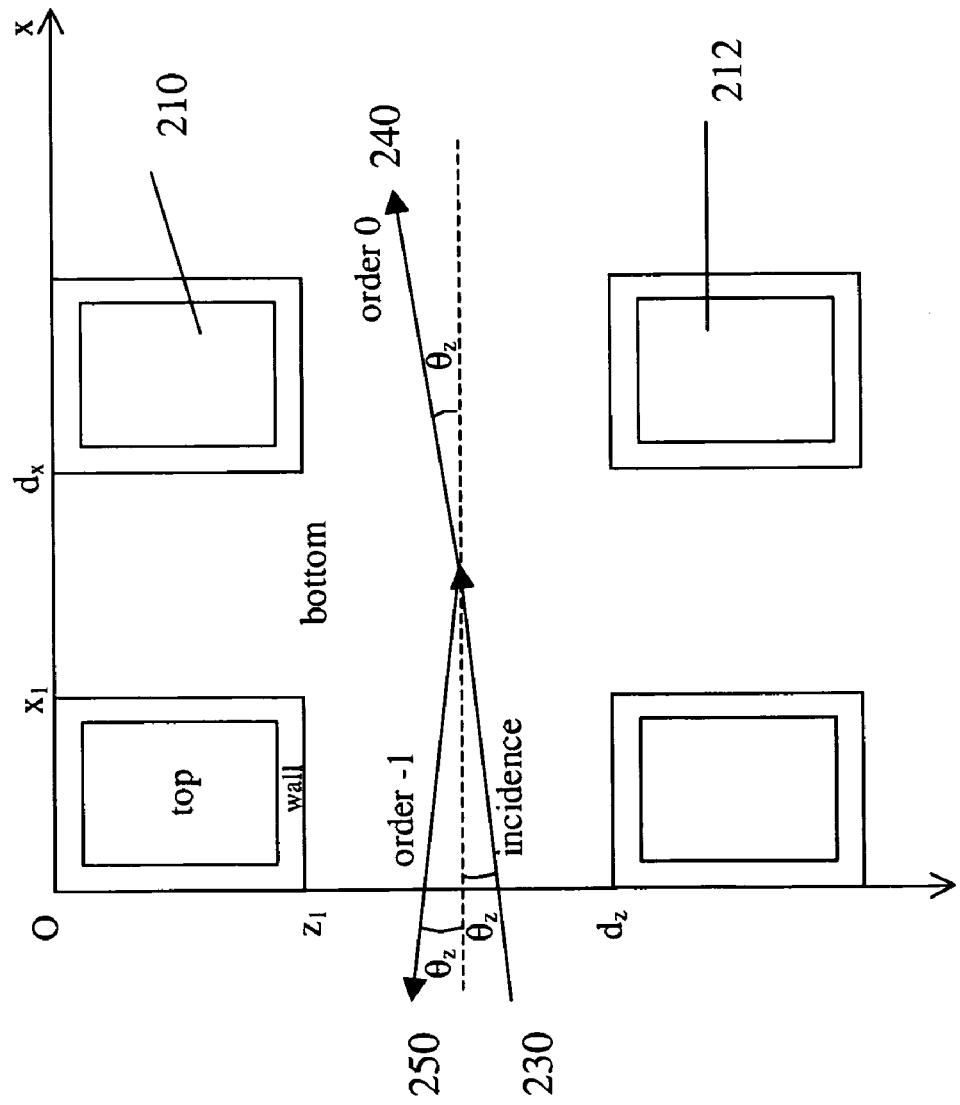
FIG. 13 shows a schematic, top plan view of a grating device having 3-D, truncated pyramidal groove structures, according to an exemplary aspect of the invention.
Figure 14:
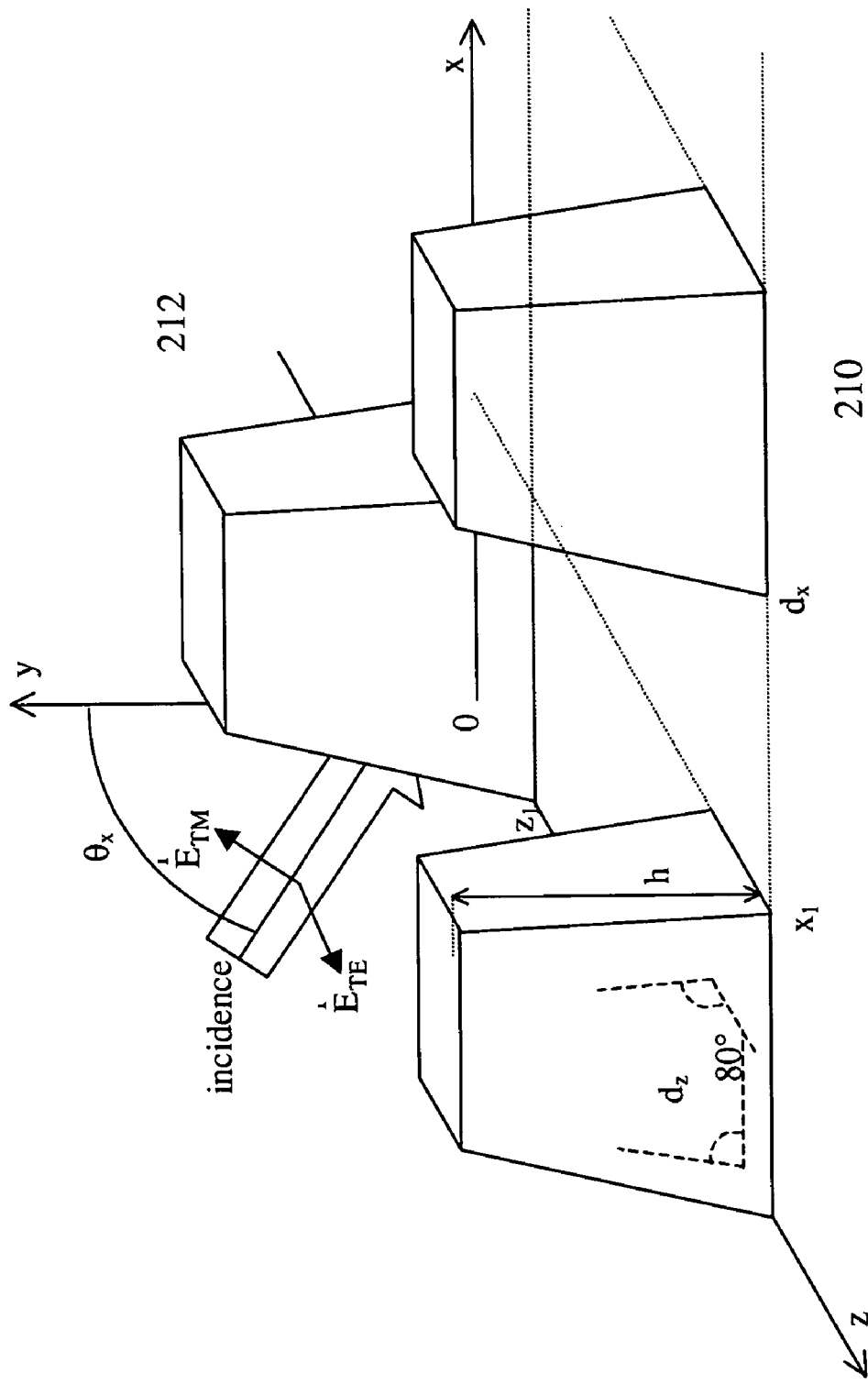
FIG. 14 shows a schematic, isometric (3-D) view of the grooves as shown in FIG. 13.

FIG. 13 illustrates another aspect of the 3-D diffracting device where the sinusoidal periodic structures of the device shown in FIGS. 7 and 8 are replaced by structures with trapezoidal cross-section 210 and 212, for example (here shown in a top view in the x-z plane). The incident working conditions lie close to the x-y plane, as shown in FIGS. 13 and 14 for the case of grating structures represented by truncated pyramids. The design includes some shift off-plane, so that Littrow mount diffraction does not fall into an entry slit (or, e.g., fiber). This introduces a non-zero angle $\theta_z$ between the plane of incidence 230 and the x-y plane (see FIG. 13). The period in the x-direction, $d_x$, is chosen so that the dispersive $-1^{st}$ order created by this (first) grating goes back close to the incident beam (close Littrow mount for the middle of the spectral interval at 1.55 μm), but in another plane of diffraction 250, in order to avoid the incident slit (or fiber). Reference 240 shows the zero-order specular beam.

The period in the perpendicular z-direction, $d_z$, is chosen so that this (second) grating does not create propagating dispersive orders; thus the only two orders that propagate are the zero-specular order and the $-1^{st}$ (dispersive) order diffracted by the periodic grating in the x-direction. The presence of the crossed (second) grating along the z-axis provides additional degrees of freedom in the periodicity $d_z$ and structure width $z_1$. These additional parameters provide control (i.e., enhancement) of the efficiency in TE polarization. The widths $x_1$ and $z_1$ of the trapezoidal structures may be the same or different in order to enhance efficiency. The two fundamental (TE or TM) polarizations are taken with respect to the plane of incidence.

In a particular aspect, the device has a working spectral interval that is related to the periods $d_x$, $d_z$, as follows, where $\lambda$ is the light wavelength, $\theta_x$ is the projection of the angle of incidence on a plane parallel to the direction of the first periodicity, and $\theta_z$ is the projection of the angle of incidence on a plane parallel to the direction of the second periodicity:

for the existence of the first diffractive order created by the first periodicity:

$$|\sin \theta_x - \lambda/d_x| < 1;$$

for the absence of higher orders created by the first periodicity:

$$|\sin \theta_x + \lambda/d_x| > 1;$$

$$|\sin \theta_x - 2\lambda/d_x| > 1; \text{ and}$$

for the absence of non-specular orders created by the second periodicity:

$$|\sin \theta_z - \lambda/d_z| > 1.$$

Several different truncated pyramid profiles with slope angles varying from 70° to 85° (see FIG. 14) were tested. It was possible to optimize the efficiency behavior by varying the bump dimensions, i.e., their height h and the waist at mid-height in the x- and z-directions.

In accordance with an illustrative example of a three-dimensional grating structure as shown in FIGS. 13 and 14, FIG. 12($a$,$b$), respectively, show the diffraction efficiency of two (first and second) 3-D grating devices. Gold was the substrate and bump material; $\theta_x=60°$ incidence and was 3° off-plane. The first grating device had an 80° slope of the pyramids, $d_x$=0.89489 μm, $d_z$=1.4 μm, bump height $h_x$=0.49 μm, bump width at half-height 0.3 μm in x, 0.54 μm in z; the second grating had a 70° slope of the pyramids, $d_x$=0.89489 μm, $d_z$=1.4 μm, bump height $h_x$=0.49 μm, bump width at half-height 0.3 μm in x, 0.68 μm in z. As shown, the optimal groove depths (h) are the same, slightly exceeding half of the shorter period. The optimal bump widths vary with the slope angle and must be tuned as a function of the real slope angle obtained during the (e.g., chemical or ion beam) etching process, which allows for better control of groove parameters when compared to standard holographic grating recording, that results in quasi-sinusoidal profiles.

Figure 15:
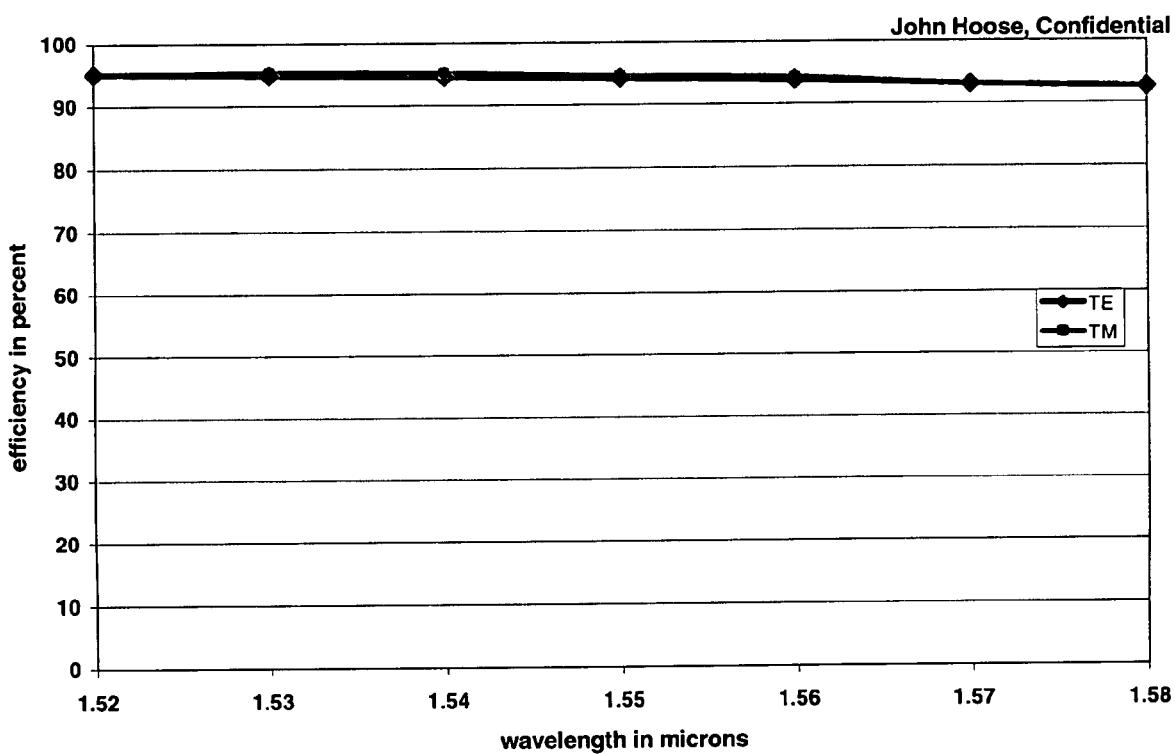
FIG. 15 graphically shows the TE and TM polarized diffraction efficiency for the trapezoidal grooves as shown in FIG. 13.

FIG. 15 further represents the TE and TM diffraction efficiency behavior for a truncated pyramidal surface relief structure grating as shown in FIG. 13. As can be seen, the efficiency is substantially the same and above 90%. for both TE and TM polarizations, indicating little or no PDL.

The use of the terms "a" and "an" and "the" and similar references in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

I claim:

1. A three-dimensional diffractive device, comprising:
a substrate having a diffracting structure, wherein the structure further comprises:
a first periodic diffracting structure having a periodicity, $d_x$, in a first direction, and a groove depth, $h_x$, characterized by only a single dispersing diffracting plane that supports a single propagating first-dispersing-order of light and a zero-specular order; and
a second periodic structure having a periodicity, $d_z$, in a second direction that is different than the first direction, and a groove depth, $h_z$, that supports only a zero-specular order for the periodicity $d_z$, wherein the device has a working spectral interval that is related to the periods $d_x$, $d_z$, as follows, where λ is the light wavelength, $θ_x$ is the projection of the angle of incidence on a plane parallel to the direction of the first periodicity, and $θ_z$ is the projection of the angle of incidence on a plane parallel to the direction of the second periodicity:

for the existence of the first diffractive order created by the first periodicity:

$$|\sin θ_x - λ/d_x| < 1;$$

for the absence of higher orders created by the first periodicity:

$$|\sin θ_x + λ/d_x| > 1;$$

$$|\sin θ_x - 2λ/d_x| > 1; \text{and}$$

for the absence of non-specular orders created by the second periodicity:

$$|\sin θ_z - λ/d_z| > 1.$$

2. The diffractive device of claim 1, wherein the groove depths are constant for each periodic structure.

3. The diffractive device of claim 1, wherein the first and second periodic structures are sinusoidal and have a grating profile, f(x, z), expressed as $$f(x,z) = (h_x/2)\sin(K_x x) + (h_z/2)\sin(K_z z),$$

where groove numbers $K_x = 2π/d_x$ and $K_z = 2π/d_z$.

4. The diffractive device of claim 1, wherein the first and second periodic structures are three-dimensional diffracting structures.

5. The diffractive device of claim 4, wherein the three-dimensional diffracting structures are vertical cylinders.

6. The diffractive device of claim 4, wherein the three-dimensional diffracting structures are pyramids.

7. The diffractive device of claim 4, wherein the three-dimensional diffracting structures are truncated pyramids.

8. The diffractive device of claim 4, wherein the three-dimensional diffracting structures are conic forms.

9. The diffractive device of claim 1, wherein the diffracting structure includes a high reflectance metallic layer.

10. The diffractive device of claim 9, wherein the metallic layer has a thickness from about 50 nanometers to 150 nanometers.

11. The diffractive device of claim 9, wherein the diffracting structure is covered with a dielectric layer.

12. The diffractive device of claim 11, wherein the dielectric layer has a thickness of about 50 nanometers.

13. The diffractive device of claim 1, wherein the first and second periodic structures comprise at least two alternating layers of a high index dielectric material and a low index dielectric material.

14. The diffractive device of claim 1, wherein the substrate has a curvature.

15. A three-dimensional diffractive device, comprising:
a substrate having a diffracting structure, wherein the structure further comprises:
a first periodic diffracting structure having a periodicity, $d_x$, in a first direction, and a groove depth, $h_x$, characterized by only a single dispersing diffracting plane that supports a single propagating first-dispersing-order of light and a zero-specular order; and
a second periodic structure having a periodicity, $d_z$, in a second direction that is different than the first direction, and a groove depth, $h_z$, that supports only a zero-specular order for the periodicity $d_z$, wherein the first direction is orthogonal to the second direction.

16. The diffractive device of claim 15, wherein the groove depths are constant for each periodic structure.

17. The diffractive device of claim 15, wherein the first and second periodic structures are sinusoidal and have a grating profile, f(x, z), expressed as $f(x, z)=(h_x/2) \sin(K_x x)+(h_z/2)\sin(K_z z)$, where groove numbers $K_x=2\pi/d_x$ and $K_z=2\pi/d_z$.

18. The diffractive device of claim 15, wherein the first and second periodic structures are three-dimensional diffracting structures.

19. The diffractive device of claim 18, wherein the three-dimensional diffracting structures are vertical cylinders.

20. The diffractive device of claim 18, wherein the three-dimensional diffracting structures are pyramids.

21. The diffractive device of claim 18, wherein the three-dimensional diffracting structures are truncated pyramids.

22. The diffractive device of claim 18, wherein the three-dimensional diffracting structures are conic forms.

23. The diffractive device of claim 15, wherein the diffracting structure includes a high reflectance metallic layer.

24. The diffractive device of claim 23, wherein the metallic layer has a thickness from about 50 nanometers to 150 nanometers.

25. The diffractive device of claim 23, wherein the diffracting structure is covered with a dielectric layer.

26. The diffractive device of claim 25, wherein the dielectric layer has a thickness of about 50 nanometers.

27. The diffractive device of claim 15, wherein the first and second periodic structures comprise at least two alternating layers of a high index dielectric material and a low index dielectric material.

28. A three-dimensional diffractive device, comprising:
a substrate having a diffracting structure, wherein the structure further comprises:
a first periodic diffracting structure having a periodicity, $d_x$, in a first direction, and a groove depth, $h_x$, characterized by only a single dispersing diffracting plane that supports a single propagating first-dispersing-order of light and a zero-specular order; and
a second periodic structure having a periodicity, $d_z$, in a second direction that is different than the first direction, and a groove depth, $h_z$, that supports only a zero-specular order for the periodicity $d_z$, wherein $h_x=h_y$.

29. The diffractive device of claim 28, wherein the groove depths are constant for each periodic structure.

30. The diffractive device of claim 28, wherein the first and second periodic structures are sinusoidal and have a grating profile, f(x, z), expressed as $f(x, z)=(h_x/2) \sin(K_x x)+(h_z/2)\sin(K_z z)$, where groove numbers $K_x=2\pi/d_x$ and $K_z=2\pi/d_z$.

31. The diffractive device of claim 28, wherein the substrate has a curvature.

* * * * *

UNITED STATES PATENT AND TRADEMARK OFFICE
CERTIFICATE OF CORRECTION

PATENT NO. : 8,279,525 B2
APPLICATION NO. : 12/469904
DATED : October 2, 2012
INVENTOR(S) : John Hoose It is certified that error appears in the above-identified patent and that said Letters Patent is hereby corrected as shown below:

Column 12, claim 30, line 24, "$2\pi/d$," a subscript x should be inserted after the "d" and would appear as "$2\pi/d_x$."

Signed and Sealed this
Twelfth Day of February, 2013

Teresa Stanek Rea
*Acting Director of the United States Patent and Trademark Office*